Jan. 10, 1961    J. A. SIRONS    2,968,035
RADIO COMPASS
Filed Jan. 26, 1956
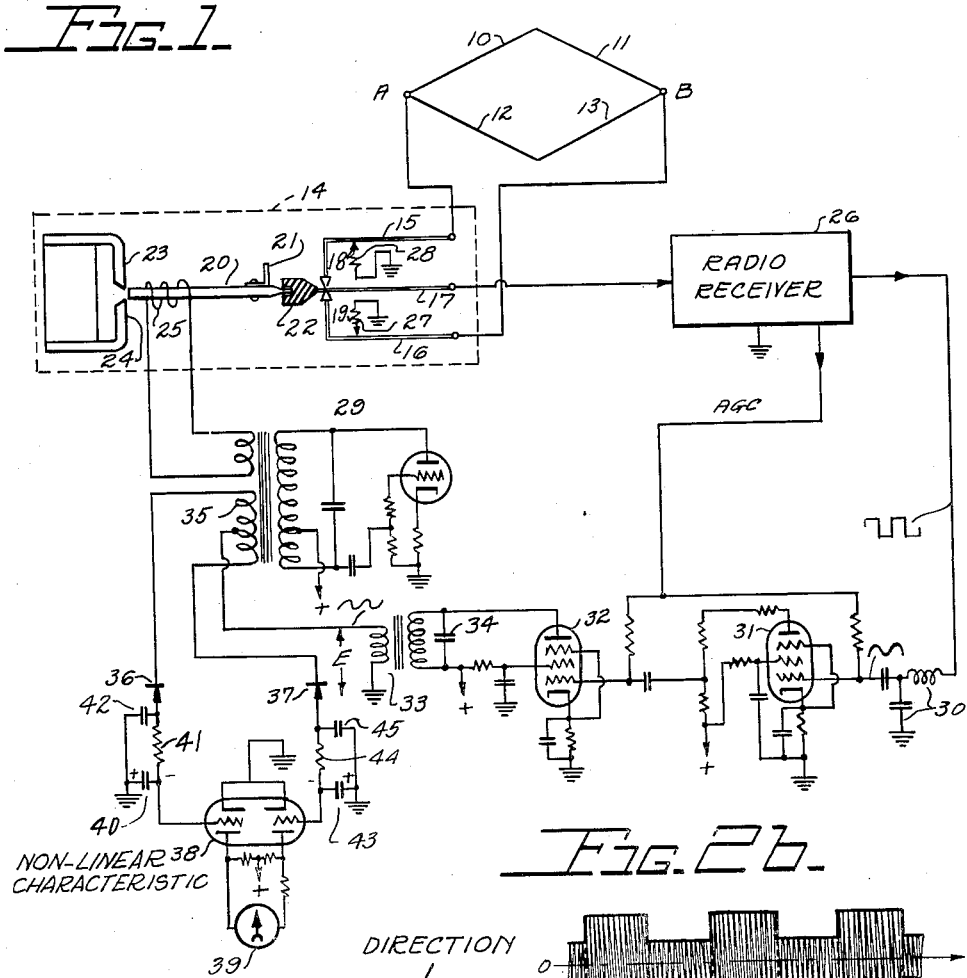
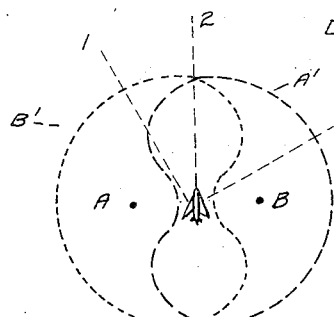
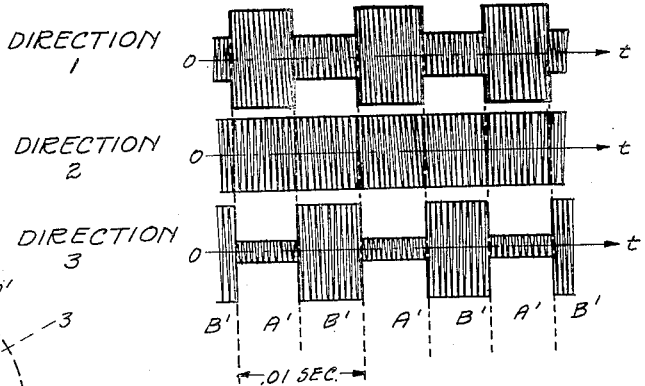
INVENTOR.
JANIS A. SIRONS United States Patent Office 2,968,035
Patented Jan. 10, 1961

2,968,035
RADIO COMPASS

Janis A. Sirons, Springfield, Ohio, assignor to the United States of America as represented by the Secretary of the Air Force Filed Jan. 26, 1956, Ser. No. 561,694

1 Claim. (Cl. 343—120)

(Granted under Title 35, U.S. Code (1952), sec. 266)

The invention described herein may be manufactured and used by or for the United States Government for governmental purposes without payment to me of any royalty thereon.

This invention relates to radio compasses and particularly to those of the antenna lobe switching type.

Radio compass devices utilize a directional antenna to indicate the angular relation of an axis of the antenna, and therefore the axis of the airplane, to the direction from the airplane to a ground transmitter. It is usually sufficient to indicate whether the heading of the airplane is to the right or the left of the ground transmitter. Directional antennas of the lobe switching type have associated therewith a two-position switching device for alternately switching between two similar directive field patterns, one favoring signals received from a source to the right of the antenna axis and the other favoring signals from a source to the left of the antenna axis. The response of the antenna to signals from a source on the antenna axis is the same for either pattern.

The radio compass circuit compares the signals received under the two directive conditions of the antenna to give an indication as to whether the signal source is to the right or left of the antenna axis. In order to accomplish this comparison it is necessary that the comparing means in the receiver be capable of channeling signals from the two directive patterns into separate circuits. This requires a switching device in the comparing means operating in phase with the antenna lobe switch.

For reasons of simplicity and reliability, and for other reasons, it has been found desirable to use mechanical antenna lobe switches. Heretofore, in radio compass circuits using mechanical switches, it has been the practice to either supply the antenna switch with additional contacts to provide the required synchronized switching for the comparator or else to provide a separate switch in the comparator coupled to the antenna switch. In either case the reliability of the circuit is decreased and the maintenance required is increased due to the increased number of switch contacts. It is the object of the invention to provide a radio compass circuit using a mechanical antenna lobe switch but providing the synchronized comparator switching by entirely electrical means. Briefly, this is accomplished by employing an antenna switch capable of operating in synchronism with a driving alternating current together with a comparator of the phase sensitive detector type which derives its reference phase from the source supplying driving current to the antenna switch.

Further objects of the invention are to provide means for reducing course errors due to excessive signal strength near the ground transmitter and to provide means for reducing fluctuations in the right-left indicator due to space variations in received signal strength.

The invention will be described in more detail in connection with the specific embodiment thereof shown in the accompanying drawing in which—

Fig. 1 is a schematic diagram of a radio compass incorporating the invention, and Figs. 2a and 2b are diagrams illustrating the operation of Fig. 1.

Referring to Fig. 1, the antenna is made up of conductors 10, 11, 12 and 13 connected in a closed loop having the shape of a rhombus. In the frequency range from 200–400 mc./s. the physical dimensions of an antenna of of this type are sufficiently small for airborne use.

If A is made the feed point and B the terminating point of the antenna its field pattern is as shown by the polar digram A′ of Fig. 2a. If the feed and terminating points are now interchanged the field pattern of the antenna is as shown by polar diagram B′. If a source of radio waves, such as a ground transmitter, lies along direction 2 the output of the antenna is the same for either lobe A′ or B′. If the source is to the left of line 2, as in the direction 1, the signal for lobe B′ is greater than that for A′, whereas, for a source to the right of line 2, as along line 3, the signal for lobe A′ is greater than for lobe B′. If the lobes are switched periodically, the radio frequency output of the antenna for the above three directions is shown in Fig. 2b.

Switch 14 in Fig. 1 is a device for periodically switching the lobes of the antenna by interchanging its feed and terminating points. Switches for this purpose are described in detail and claimed in my application Serial No. 561,693 filed January 26, 1956, which issued as Patent No. 2,901,748, August 25, 1959. For the purpose of this invention any suitable switch may be used at this point provided it is driven by alternating current and its operation is in synchronism with the driving current. Generally speaking, the switch shown comprises cantilever spring contacts 15 and 16 biased toward driven contact 17. Contacts 18 and 19 are fixed and act as stops for contacts 15 and 16. Contact 17 is shown in its neutral position in which all of the contacts, namely 17—15, 17—16, 17—18, and 17—19 are closed. Armature 20 is supported by angle member 21, which serves as a stiff torsion pivot, and has one end coupled to contact 17 through an insulating extension 22. The fixed poles 23 and 24 of a permanent magnet are positioned adjacent the other end of armature 20 and are centered relative to the neutral position of the armature. When an alternating current passes through coil 25 there is an alternate attraction and repulsion between the fixed poles 23—24 and the adjacent end of armature 20 due to the change in magnetic polarity at the end of the armature with each half-cycle of the current in coil 25. The resulting oscillation of armature about its neutral position is transmitted to contact 17 through extension 22 and causes this contact to likewise oscillate about its neutral position. A suitable frequency for the current in coil 25 and rate of operation of switch 14 is 100 c/s. The source of driving energy may be a local oscillator, generally indicated at 29, tuned to 100 c/s.

When contact 17 is above its neutral position, point A of the antenna is connected to receiver 26 through contacts 17—15 and point B is connected to ground through contacts 16—19 and terminating resistor 27. In positions of contact 17 below the neutral position, point B is connected to the receiver through contacts 17—16 and point A is connected to ground through contacts 15—18 and terminating resistor 28 which has the same value as resistor 27. As shown in the referenced patent application, the switch may be designed so that the transition through the neutral position occupies no more than 3% of the period of one cycle.

The nature of the radio frequency waves applied to the receiver is as shown in Fig. 2b. If the source lies in direction 2 (Fig. 2a) essentially a constant radio frequency wave (zero amplitude modulation) is applied to the receiver and the receiver output is zero. If the source lies to the right or left of direction 2, the input to the receiver has a rectangular amplitude modulation with a frequency corresponding to the switch frequency, 100 c./s., and a magnitude determined by the amplitude difference in the signals for the two antenna lobes. Further, as may be seen in Fig. 2b, the phase of this modulation is opposite for signals received from opposite sides of direction 2.

The output of the receiver corresponds to the envelope of the input radio frequency wave and therefore, except for the on-course condition is a rectangular wave. A low pass filter 30 removes most of the higher harmonic content of the rectangular wave, passing very little in addition to the fundamental frequency. This wave, mostly fundamental, passes through variable gain amplifiers 31 and 32 to transformer 33, the primary of which is tuned to the switch frequency (100 c./s.) by condenser 34. The wave across the secondary of transformer 33 as a result of the tuned circuit and filter 30 is therefore a substantially pure sine wave corresponding to the fundamental of the rectangular wave output of the receiver.

The amplitude of the sine wave at the secondary of transformer 33 is determined by the difference in amplitudes of the antenna output for the two lobes and therefore by the deviation of the direction to the ground transmitter relative to direction 2 (Fig. 2a). Also the phase of this sine wave, like the phase of the radio frequency rectangular envelope, indicates the sense of the deviation, i.e., whether it is to the right or left of direction 2. It is the purpose of the comparator to indicate the magnitude and sense of the deviation. The comparator is a rectifier of the phase sensitive type and comprises secondary winding 35, rectifiers 36 and 37, dual triode 38 and an indicator in the form of a center zero high impedance voltmeter 39. The sine wave output of transformer 33 is applied to the center tap of winding 35. It will be apparent that the signal voltage E is applied to the two rectifiers 36 and 37 in the same phase whereas the alternating voltages derived from winding 35 are applied in opposite phase. Further, since the driving voltage for switch 14 either has the same phase or an opposite phase (depending upon winding directions) relative to the voltage across winding 35, the voltage E will have the same phase as the voltage applied to one of the rectifiers from winding 35 and a phase opposite to that applied from this winding to the other rectifier.

When $E=0$, equal negative voltages are developed across condensers 40 and 43 of low-pass filters 40—41—42 and 43—44—45 located in the output circuits of rectifiers 36 and 37, respectively. With equal-potentials on the grids of tube 38 the anode potentials are equal and meter 39 indicates zero. When E has a value greater than zero two voltages are applied to rectifiers 36 and 37 that are in phase in the case of one rectifier and of opposite phase in the case of the other rectifier. The rectifier receiving the inphase voltages will have the greater output causing a deflection of the meter to the right or left depending upon the phase of E which in turn depends upon the position of the signal source relative to axis 2 in Fig. 2a. The magnitude of the deflection depends upon the amplitude of E.

When a radio compass is used in an airplane considerable variation in received signal strength is experienced as the craft moves through space. The variation is due to the fact that the signal received at any point in space is the vector sum of the signals received over a direct path and various other paths involving one or more reflections. Due to the relatively high speed of an airplane this pattern changes at a sufficiently high rate to cause erratic changes in the amplitude of the received signal. Integrating networks 40—41—42 and 43—44—45 are designed with time constants exceeding this rate of variation for the purpose of reducing its effect on the meter indication.

Another problem in the use of radio compasses results from the rapid increase in signal strength as the aircraft approaches the ground transmitter, which causes exaggerated readings on meter 39 in the vicinity of the ground station. Ideally the output of receiver 26 would be independent of the distance from the transmitter. The normal automatic volume and gain controls of the receiver operate toward this end but are unable to cope with the strong signals near the transmitter. In the circuit disclosed, excessive increase in the value of E as the aircraft approaches the source of signals is prevented by interposing variable gain amlpifiers 31 and 32 between the output of the receiver and transformer 33. The automatic gain control voltage generated in the receiver is applied to the grids of these tubes for controlling their gains.

Another method of reducing excessive indications near the source of signals, which may supplement the above method, is the utilization of a nonlinear transmission device between the output of rectifiers 36, 37 and meter 39. The characteristic of the device should be such that its rate of change of output relative to the input decreases as the absolute magnitude of the input increases. Vacuum tubes having a nonlinear characteristic in the negative grid region, such as the remote cut-off tubes used for automatic volume control, have this property and tubes of this type may be used for the two sections of tube 38.

I claim:

A radio compass circuit comprising directive antenna means, an alternating current driven mechanical switching means connected to said antenna means for alternately switching the directivity of said antenna means between two positions in one of which the directivity is to the right of a predetermined axis through the antenna and in the other which the directivity is an equal amount to the left of said axis, a radio receiver having its input connected to said antenna means, said receiver having means for generating an automatic gain control voltage, a phase sensitive rectifier having a signal input circuit and a reference phase input circuit and producing in its output circuit a direct voltage having an amplitude proportional to the amplitude of the signal applied to its input circuit and a polarity determined by the phase of the input signal with respect to the reference phase, a variable gain amplifier connected between the output of said receiver and the signal input of said phase sensitive rectifier, means for applying said automatic gain control voltage to said amplifier for controlling its gain in inverse relation to the received signal strength, means for energizing said switching means and the reference phase input to said rectifier from a common source of alternating current, means for indicating the magnitude and polarity of a direct voltage, and a time constant integrating circuit and a nonlinear transmission device connected in cascade between the output of said rectifier and said indicating means, said nonlinear device having a transmission characteristic such that the rate of change of its output relative to its input decreases as the absolute magnitude of the input increases.

References Cited in the file of this patent

UNITED STATES PATENTS

| 2,145,876 | Hinman | Feb. 7, 1939 |
| 2,197,734 | Steinhoff | Apr. 16, 1940 |
| 2,279,021 | Cooper | Apr. 7, 1942 |
| 2,432,173 | Rhea | Dec. 9, 1947 |
| 2,439,044 | Ferrill | Apr. 6, 1948 |
| 2,468,066 | Heaton-Armstrong | Apr. 26, 1949 |
| 2,568,538 | Brailsford et al. | Sept. 18, 1951 |
| 2,578,758 | Stiber | Dec. 18, 1951 |
| 2,605,465 | Brailsford | July 29, 1952 |